United States Patent [19]

Pinkley

[11] 4,144,012
[45] Mar. 13, 1979

[54] MATERIAL HOPPER TRANSLATABLE UNIT

[76] Inventor: Paul D. Pinkley, 36538 Farmbrook Dr., Mount Clemens, Mich. 48043

[21] Appl. No.: 822,065

[22] Filed: Aug. 5, 1977

[51] Int. Cl.² .................................................. B29F 1/08
[52] U.S. Cl. .............................. 425/225; 425/378 R; 425/551; 425/580; 425/585; 34/54; 209/223 R
[58] Field of Search .................. 425/376, 3, 86, 377, 425/378 R, 225, 445, 449, 551, 574, 580, 583, 585; 34/54; 209/223 R

[56] References Cited

U.S. PATENT DOCUMENTS

| | | | |
|---|---|---|---|
| 1,138,889 | 5/1915 | Rand | 209/223 R X |
| 2,253,362 | 8/1941 | Broekhuysen | 209/223 R X |
| 2,358,956 | 9/1944 | Ashbough | 425/585 X |
| 2,914,804 | 12/1959 | Gaspar et al. | 425/555 X |
| 4,016,922 | 4/1977 | Simmons et al. | 425/551 X |

Primary Examiner—Robert L. Spicer, Jr.
Attorney, Agent, or Firm—Burton, Parker & Schramm

[57] ABSTRACT

Relates to plastic material molding machines and to a unitary assembly of parts installable between the hopper and the plastic pellet material inlet opening of the molding machine for providing bodily translatable movement of the hopper to one side of the machine where the remaining contents of the hopper may be discharged into a drainage collector for possible re-use at a later time. The translatable movement of the hopper is usually performed when the hopper content is to be changed and is carried out by moving or sliding the hopper while in upright position along a track extending laterally of the machine. The track occupies the upper position of a gas-tight conduit, preferably rectangular in cross section, which serves to deliver a gaseous medium to the contents of the hopper, such as hot dry air for the purpose of removing moisture from the plastic pellets in the hopper. The hollow interior of the conduit is used to house a magnetic field producing means at the entrance of the inlet to the molding machine for attracting and withdrawing unwanted steel fragments and the like from the stream of plastic material before it enters the machine.

10 Claims, 8 Drawing Figures

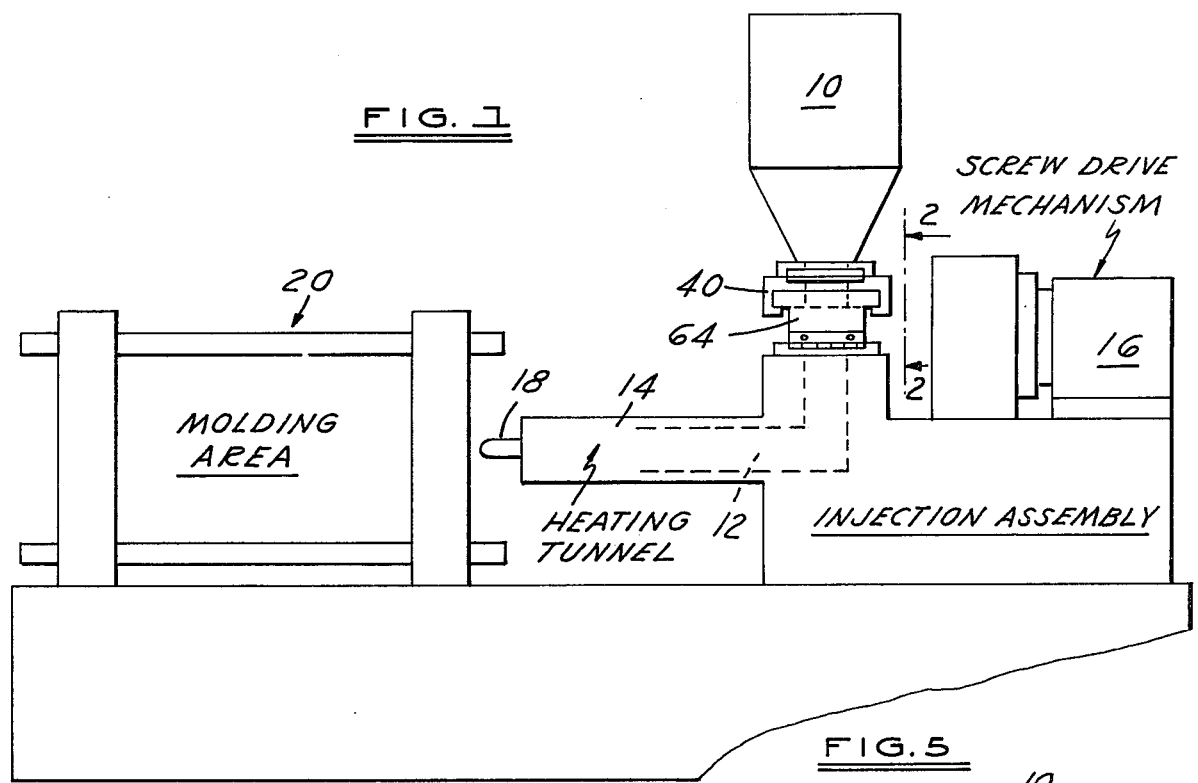
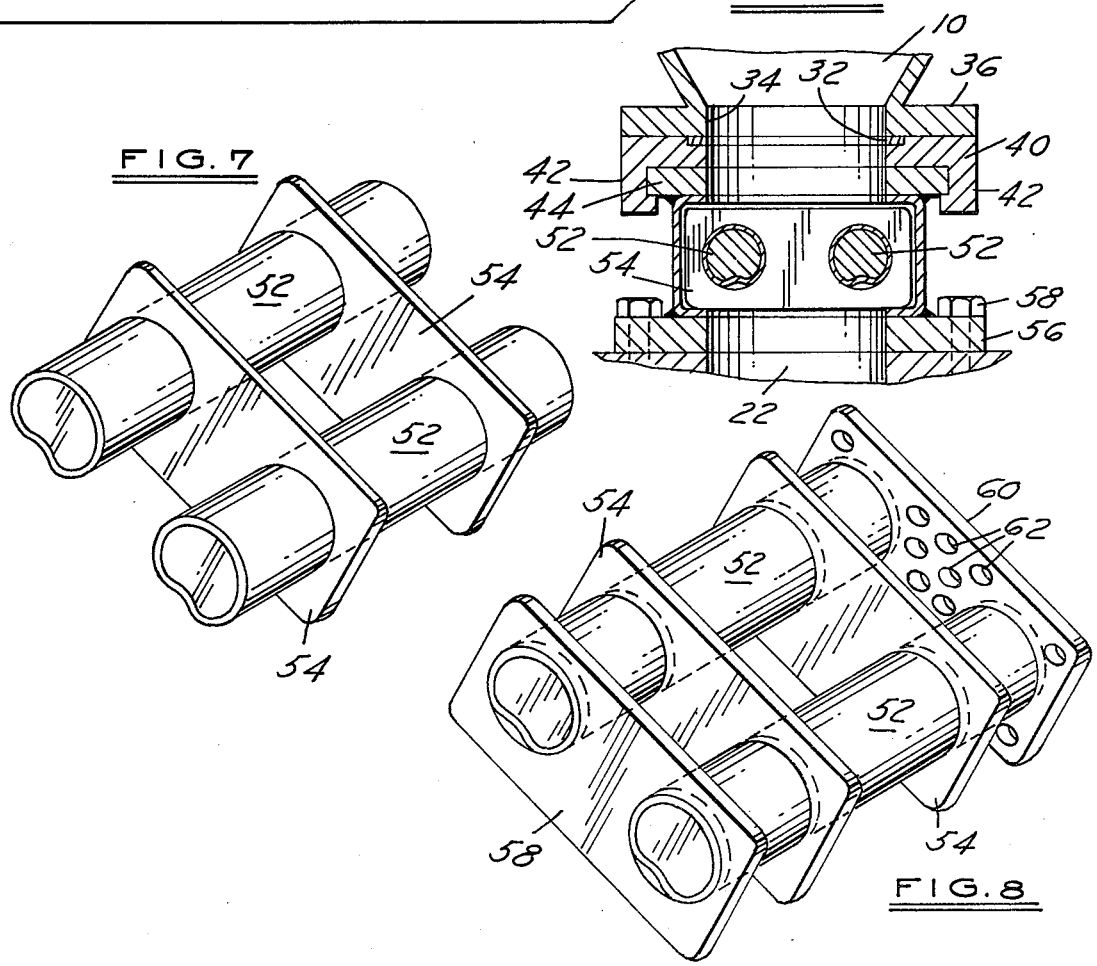

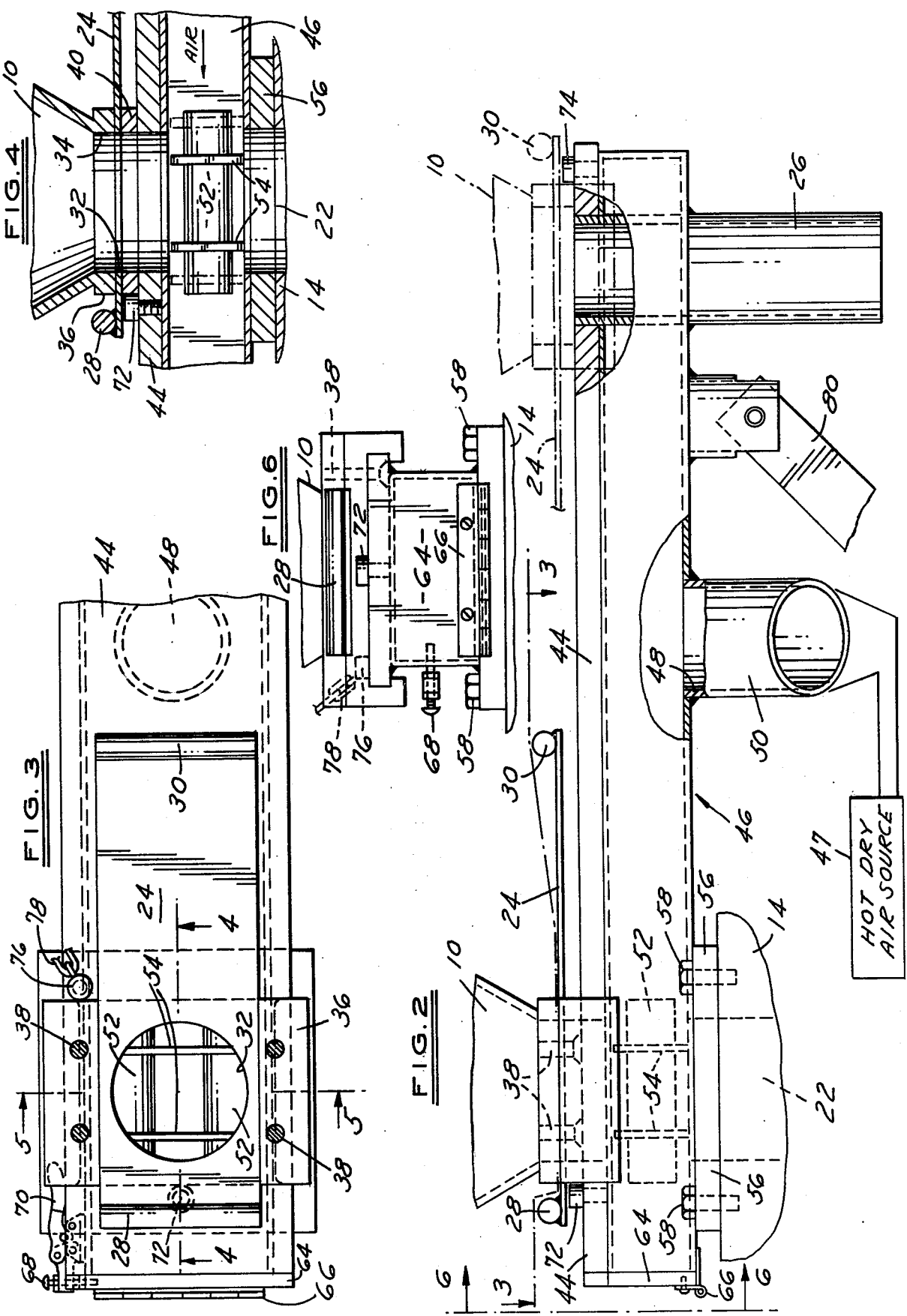

MATERIAL HOPPER TRANSLATABLE UNIT

BACKGROUND OF THE INVENTION

This invention relates to improvements in the usage of the hopper and the hopper feed throat arrangement of plastic molding machines and particularly those machines of the injection type.

Relatively little effort has been expended by workers in this art to improving the feeding operations of the hoppers associated with plastic molding machines whether it has to do with the feed of the granular plastic material into the inlet of the machines or for cleaning the hoppers in preparation for receiving a new and different supply of plasticating material. In most if not all instances the hoppers were stationarily mounted on their respective plastic molding machines each having a valve controlled vent in the side wall of the hopper near the bottom thereof for the purpose of cleaning out the hopper. This usually required a man to mount the machine and scoop the reachable plastic pellets out of the hopper. This also required operating the machine to run out what plasticating material remained in the injection machine and resulting in an absolute waste of material. Lastly, the hopper was disconnected from the machine and placed over a collecting receptacle such as a barrel while the remnants of the plastic pellets were cleared out of the hopper, following which the hopper was remounted back on the machine. All this amounted to considerable machine down-time. In addition, the entry of metal particles into the molding machines caused not only serious damages to the machines but also longer machine down-time plus part cost and labor for the necessary repairs. In view of these difficulties and problems, it is apparent that there is a need for improvements in the art and especially in the direction of reducing machine down-time for cleaning the hoppers and for making repairs to the machine caused by the induction of foreign matter.

SUMMARY OF THE INVENTION

Accordingly, an important object of the invention is to provide an improved method of and apparatus for feeding plasticating material into plastic molding machines and similar equipment which overcomes the aforementioned difficulties and problems encountered heretofore in the art to which this invention relates.

Another important object of the invention is to substantially decrease the machine down-time for cleaning and repairing the feeding of plasticating materials to plastic molding equipment.

A further important object of the invention is to provide a highly efficient assembly of working parts which is designed for inter-position between a material feed hopper and the inlet throat of a plastic molding machine and which enables (1) the hopper to be laterally displaced to one side for drainage purposes, (2) the conduction of a gaseous medium to treat the plasticating material in the hopper, and (3) the housing of a magnetic field producing means adjacent to the inlet throat of the machine.

In carrying out these and other objects, the invention contemplates the installation of a novel unitary assembly between the material feed hopper and the inlet throat of a plastic molding machine and similar equipment. The novel assembly includes a track or guideway for displacing the hopper away from the throat of the molding machine and preferably to a location or station where the discharge aperture of the hopper aligns with a drain outlet. Such a movement of the hopper is very helpful at clean-out time because the operation can be performed quickly, requires only a few minutes to drain and is accomplished with no material waste. It also enables the hopper to be moved off the inlet throat allowing immediate access to the heating tunnel of the machine for removing a restriction therein or for purging another material into the machine.

The hopper track not only guides the hopper in its bodily movement but also serves as the upper portion or wall of a conduit for conveying a gaseous medium for treating the plasticating material in the hopper before or during the feed of such material into the molding machine. One such treatment may be hot dry air fed through the conduit to the discharge end of the hopper where such air is directed upwardly into the hopper for drying out any moisture in the content of the hopper. Also, the conduit serves as a protective housing in which magnetic field producing means is located across the inlet throat for attracting metal particles out of the stream of plasticating material being fed from the discharge end of the hopper to the inlet throat of the molding machine.

BRIEF DESCRIPTION OF THE DRAWING FIGURES

Various other objects, advantages and meritorious features of the invention will become more fully apparent from the following specification, appended claims and accompanying drawing figures wherein:

FIG. 1 is a side elevation of a plastic injection molding machine for which the invention is adapted and showing the location and certain major components of an embodiment of the invention therefor;

FIG. 2 is a side elevation taken along line 2—2 of FIG. 1 and showing in enlarged scale the assembly of parts making up the illustrated embodiment of the invention;

FIG. 3 is a view taken along section line 3—3 of FIG. 2 and showing in more detail the inlet throat area of the molding machine;

FIG. 4 is a vertical sectional view taken along line 4—4 of FIG. 3 through the inlet throat area of the molding machine;

FIG. 5 is a vertical sectional view taken along line 5—5 of FIG. 3 also through the inlet throat area of the molding machine;

FIG. 6 is a view in end elevation taken along line 6—6 of FIG. 2;

FIG. 7 is a perspective view of a set of magnets installable within the conduit in overlying relation to the inlet throat of the machine; and FIG. 8 is a similar view to FIG. 7 but showing a modification of the invention wherein a perforated and an unperforated plate are added to the set of magnets of FIG. 7 for particular functions inside of the conduit.

DESCRIPTION OF A PREFERRED EMBODIMENT

With initial reference to FIG. 1, a plastic material molding machine of the injection type is shown schematically in side elevation, and that part of the machine having to do with improvement for which protection is sought appears in the range of the arrows 2—2 signifying the viewing line for FIG. 2 of this case. Major components of the machine include a hopper 10 normally surmounting the inlet throat of the machine for feeding plasticating material thereto. A right-angled heating tunnel 12 conducts the admitted plasticating material into an injector unit 14 which may have a screw drive therein operated from screw drive mechanism 16. The hot melt into which the pellet material in the hopper is reduced is ejected from the nozzle 18 into a molding section 20 of the machine. When changing plasticating material the heating tunnel 12 of the machine is purged out using clear plasticating material as the purging medium.

FIG. 2 is directed to that area of the machine where the unitary assembly embodying the invention is installable as a unit between the hopper and inlet throat of the machine. Referring to FIG. 2 and the remaining Figures, the discharge end of the hopper 10 is positioned in FIG. 2 vertically over the inlet opening or throat 22 in order to discharge the content of the hopper freely into the machine when a shut-off valve member 24 is moved to opened position which condition is illustrated in full lines at the left in FIG. 2 and also in FIGS. 3-5. However, as illustrated by dot-dashed lines in FIG. 2 the hopper 10 and valve member 24 are jointly bodily translatable to the right in FIG. 2 to assume a second position or station in line with a discharge drain pipe 26. During movement of the hopper and its discharge valve between these two stations the valve member 24 should be closed in order to avoid spillage enroute, otherwise at the two stations the valve member 24 is manually movable to open or closed condition depending on operating circumstances.

The valve member 24 herein illustrated is embodied in the form of a flat rectangular plate having attached cylindrical members 28 and 30 at its opposite ends performing as handles for slidably positioning the valve plate. Adjacent to one end of the valve plate 24 is a circular hole 32 which is registrable with the discharge outlet 34 of the hopper as is evident in FIGS. 4 and 5. The opposite end of the valve shut-off plate is unperforated and when this end is disposed across the discharge outlet of the hopper the outlet is closed.

The lower discharge end of the Hopper 10 terminates in a rectangularly-shaped plate 36 which contains the discharge aperture 32 and which is secured by screws 38 to the slide plate 40. Opposite side margins 42—42 of the slide plate 40 depend downwardly and then inwardly toward one another as shown in FIGS. 5 and 6 to partially embrace a stationary guide plate 44. In this manner, the slide plate 40 is slidably mounted upon the guide plate 44 for fore and aft movement therealong. The stationary guide plate 44 is an elongated bar extending for the same cross sectional profile to and slightly beyond the drain pipe 26, and therefore the slide plate is capable of sliding movement from the inlet throat 22 to the discharge pipe 26 and return and at the same time bodily carrying the hopper 10 and valve plate 24 therewith.

It is frequently helpful to supply hot dry air to the contents of the hopper 10 and particularly to the bottom portion of the hopper in order to dry the plasticating material of moisture before the material is fed into the injection section of the machine. To this end the guide plate 44 forms a support to the underside of which a conduit 46 is welded or otherwise attached. The conduit 46 delivers hot dry air under pressure from a source 47 of such heat to the discharge end of the hopper 10 where it will rise upwardly through the material in the hopper, thus drying the material. An external view of such a conduit is illustrated in FIG. 2 where at approximately midway of its length it is provided with a port 48 to which a pipe 50 may be attached to deliver the desirous gaseous medium for treating the plasticating material in the hopper before delivery of the same to the heating tunnel of the machine.

Although the conduit 46 may be circular or otherwise rounded in cross section, it is herein shown as rectangular in cross section as evident from FIGS. 4 and 5. The rectangular cross section lends itself to the installation of magnetic field producing means in the form of a pair of similarly constructed, commercially available magnets 52—52 arranged side-by-side in a boxed-in area between the discharge outlet 34 of the hopper and the inlet throat 22 of the machine as shown in FIG. 5. The magnet assembly per se is illustrated in FIG. 7 wherein the two magnets 52—52 are shown carried by two similar plates 54—54 which are apertured to slidable fit the cylindrical bodies of the two magnets and wherein the outer dimensions of the plates are such as to easily fit the interior of the conduit 46 so that the magnets may be properly positioned between the discharge opening 34 of the hopper and the inlet 22 of the machine. In so doing the magnets serve their function of entrapping or catching metallic foreign matter in the contents of the hopper before reaching the throat of the machine.

In addition to illustrating the mounting arrangement of the pair of magnets 52—52, FIG. 5 also shows the rectangular character of the conduit 46 and its securement by welding to the underside of the guide plate 44 and extending for substantially the full length thereof and to a mounting plate 56 below the pair of magnets 52—52 secured by screws 58 to the marginal portion of the machine surrounding its inlet throat 22. It is evident from FIGS. 4 and 5 that, with the exception of the pair of magnets 52—52 and their supporting plates 54—54, all of the parts making up the multi-layer assembly shown in FIGS. 4 and 5 have registering apertures for the delivery of plasticating material from the hopper to the inlet throat of the machine.

FIG. 8 illustrates an improvement in the magnetic assembly shown in FIG. 7. Two additional plates 58 and 60 have been added to the assembly of FIG. 7, and both are dimensionally similar to plates 54—54. One plate 58 is imperforate; the other 60 is perforated with a large number of holes 62. If the end of the magnet assembly bearing the perforated plate 60 is first introduced into the conduit 46, the perforated plate will occupy a position slightly beyond the registering apertures of the multi-layer assembly of parts as shown by the dashed outline of such plate at the right end of the magnet assembly as viewed in FIG. 4. Such a perforate plate will allow the air to flow therethrough thus enabling, for example, the hot dry air received by port 48 to flow through the magnet assembly and upwardly through the hopper content. However, if the magnet assembly is turned around and the imperforate plate 58 is first introduced into the conduit 46, it will occupy the same position as did the perforated plate 60. However, because it is imperforate plate 58 will act as a barrier to the escape of plasticating material into the conduit 46 during feed of such material from the hopper into the inlet throat 22 of the machine.

The magnet assemblies are introduced into and removed from their throat overlieing position shown in FIGS. 4 and 5 through the adjacent end of the conduit 46. To prevent escape of plasticating material and hot dry air through this end of the conduit, it is closed by a door 64 hinged at its bottom as shown at 66 if FIGS. 2 and 6. The door 64 is retained in its closed condition by a pin 68 which is reciprocated by a toggle joint mechanism shown at 70 in FIG. 3 and in one position projects the pin 68 through both the door and its frame which it abuts in closed condition and in another position retracts the pin from out of the door and its frame so that the door may be swung to fully opened condition at which time the magnet assembly may be easily inserted into the conduit and removed. It is preferred to provide sealing material on either the door or door frame to prevent escape of the hot dry air which is usually operated in this environment at a pressure of 25 to 30 p.s.i. Other parts of the conduit may be similarly sealed to prevent escape of the hot air or other gases used to treat the plasticating material in the hopper.

Permanent stop pins are provided at opposite ends of the track for preventing run-off of the hopper as it travels between the machine inlet throat 22 and the drain pipe 26. One such permanent stop pin is identified at 72 near the door 64 for gaining access to the inlet throat area and the other is indicated at 74 at the right end of FIG. 2. To releasably hold the hopper against movement while functioning at the inlet throat of the machine, a removable stop pin 76 is located on the opposite side of the slide plate 40 from the permanent stop pin and sufficiently close enough to one another that they substantially abut the opposite sides of the slide plate as evident in FIG. 3. A chain 78 may be used to attach the removable stop pin to stationary part of the equipment to prevent its loss.

Provision for supporting the relatively free end of the track system for the hopper may take the form of an angularly adjustable brace 80 shown near the drain pipe 26 in FIG. 2.

While a particular embodiment of the invention has been described and illustrated, it will be understood, of course, that it is not desired that the invention be limited thereto since additional modifications may be made. It is, therefore, contemplated by the appended claims to cover any such modifications as fall within the true spirit and scope of the invention.

What is claimed is:

1. In a plastic molding machine including a hopper for containing plastic pellets or the like surmounting the material inlet opening of the machine and further including a valve member at the discharge end of the hopper which in one position opens the discharge end of the hopper for flow of the plastic pellets into the machine and in another position closes the discharge end of the hopper against such flow, the combination of:
    means forming a track leading laterally away from the inlet opening of the machine to a drain outlet, and
    means at the discharge end of the hopper engaging the track and providing bodily translatable movement of the hopper together with its valve member along the track to the drain outlet and return, said valve member being normally closed during its bodily translatable movement but operable at the drain outlet to open the discharge end of the hopper for draining unused plastic pellets retained in the hopper.

2. The apparatus defined in claim 1 wherein the hopper is supported in upright position throughout its bodily movement along the track from the inlet opening of the machine to the drainage outlet and return.

3. The apparatus defined in claim 2 wherein the track forming means also forms a conduit extending away from the inlet opening of the machine for at least part of the length of the track.

4. The apparatus defined in claim 3 wherein the conduit is substantially gas-tight and has an inlet port spaced from the material inlet opening of the plastic molding machine for admitting a gaseous medium into the conduit for flow toward and into the discharge end of the hopper for treating the plastic pellets in the hopper.

5. The apparatus defined in claim 4 wherein the gaseous medium is hot dry air for drying the plastic pellets in the hopper.

6. The apparatus defined in claim 3 wherein a magnetic field producing means is located in the conduit immediately over the inlet opening of the machine and below the discharge end of the hopper when it is stationed in surmounting relationship over the inlet opening.

7. A plastic material hopper translatable unit for use in plastic molding machines comprising, in combination:
    a conduit shaped adjacent to one end thereof to intervene between plastic material inlet opening of the plastic molding machine and the discharge end of a hopper and shaped adjacent to the other end to communicate with a drainage opening,
    a track occupying the upper portion of the conduit for at least the distance separating the material inlet opening of the molding machine from the drainage opening, and
    means associated with the discharge end of the hopper for providing bodily translational movement of the hopper along the track while supporting the hopper in upright position.

8. The apparatus defined in claim 7 wherein the conduit is of rectangular cross section for the major part of its length.

9. The apparatus defined in claim 7 wherein magnetic field producing means is located inside of the conduit and immediately over the material inlet opening of the molding machine.

10. The apparatus defined in claim 9 wherein a port is provided in the conduit between the material inlet opening of the molding machine and the drainage opening for admitting a gaseous medium into the conduit for treating the contents of the hopper.

* * * * *